June 5, 1962 O. K. KELLEY 3,037,810
WINDSHIELD AND REAR WINDOW SEALS
Filed Sept. 8, 1959 2 Sheets-Sheet 1
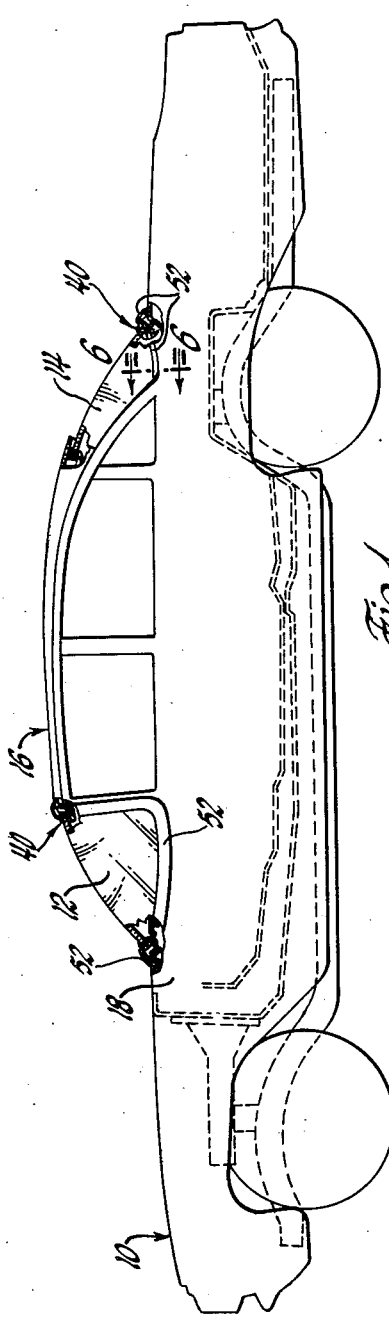
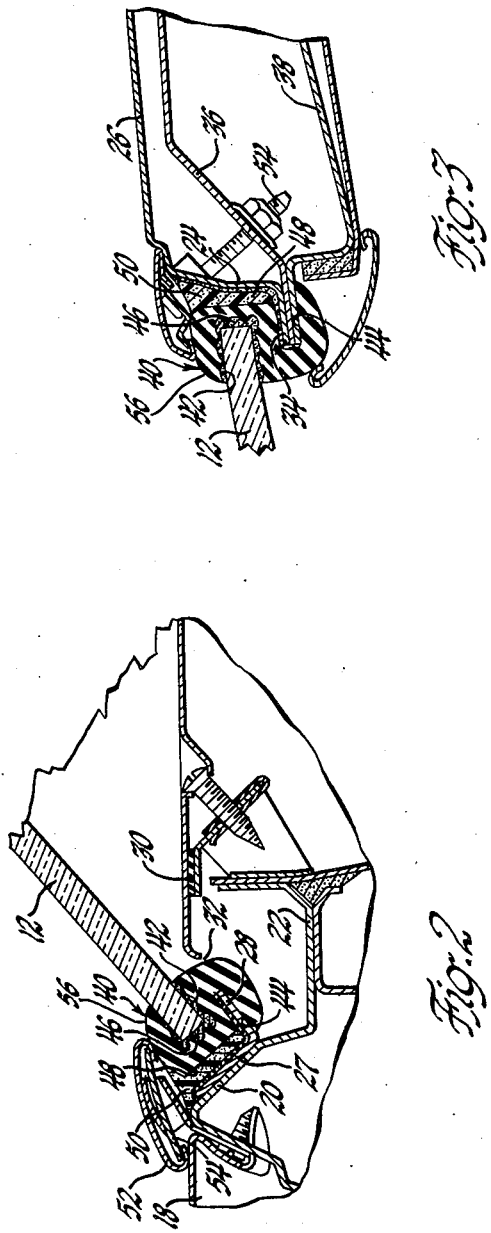
INVENTOR.
Oliver K. Kelley
BY
C. P. Barnard
ATTORNEY June 5, 1962  O. K. KELLEY  3,037,810
WINDSHIELD AND REAR WINDOW SEALS
Filed Sept. 8, 1959  2 Sheets-Sheet 2

INVENTOR.
Oliver K. Kelley
BY
C. P. Barnard
ATTORNEY

United States Patent Office 3,037,810
Patented June 5, 1962

3,037,810
WINDSHIELD AND REAR WINDOW SEALS
Oliver K. Kelley, Bloomfield Hills, Mich., assignor to General Motors Corporation, Detroit, Mich., a corporation of Delaware
Filed Sept. 8, 1959, Ser. No. 838,587
3 Claims. (Cl. 296—93)

The present invention relates to an improved windshield and rear window seal assembly for an automobile. More particularly the present invention relates to such a seal assembly in which compression loads transmitted from the vehicle body are more effectively carried by the front and rear windows.

With the evolution in vehicle body design in which larger windshield and rear windows are utilized, the windows themselves are becoming structural members through which significant compression loads are transmitted. For this reason the relatively soft and highly pliable seals through which these windows have been mounted within the vehicle body are no longer entirely effective. Accordingly, the present invention is directed to a unique window seal assembly which is considerable rigidified and thereby rendered more capable of carrying compression loads.

More specifically the present invention includes a more or less conventionally shaped window seal which includes a window body flange receiving grooves as in the past. However, the seal itself is modified so as to be more rigidly mountable within the body window openings. The seal is modified to coact with the body supporting structure to provide a cavity adapted to receive a cement substance and further in which the removable trim strip is provided around the seal permitting access thereto when the seal must be removed to replace a window.

The details as well as other objects and advantages of the present invention will be apparent from a perusal of the description which follows.

Figure 4:
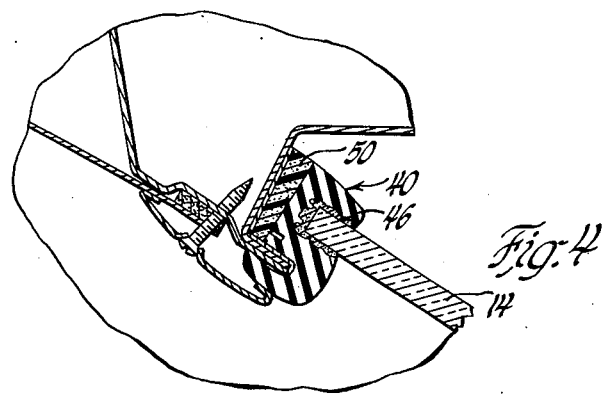
Figure 5:
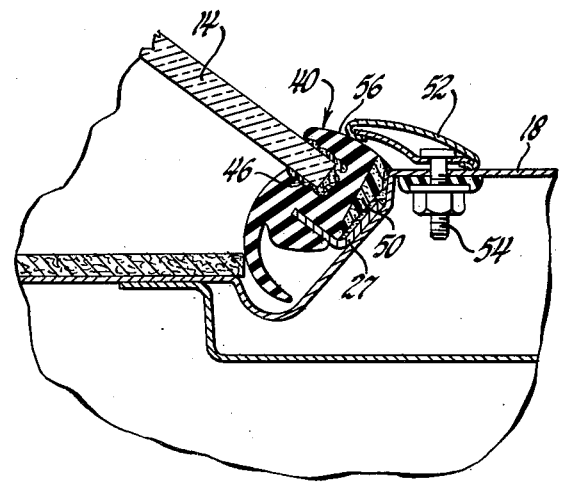
Figure 6:
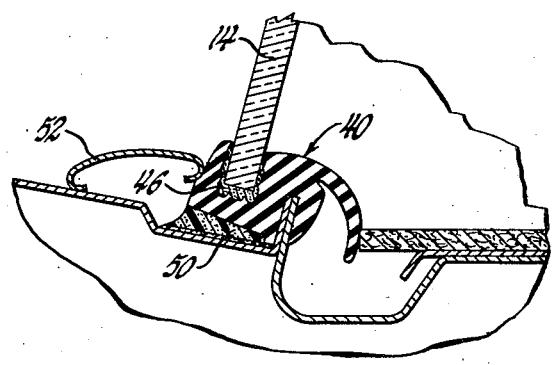

In the drawings:
FIGURE 1 shows a vehicle embodying the subject invention;
FIGURES 2 through 5 are enlarged sectional views taken from FIGURE 1 and showing the seal assembly in greater detail; and
FIGURE 6 is a view along line 6—6 of FIGURE 1.

An automobile is shown generally at 10 and includes a windshield 12 and a rear window or backlight 14 mounted between the vehicle roof 16 and the vehicle body 18.

Referring to FIGURES 2 and 3, vehicle body 18 includes a windshield receiving opening generally proscribed by surface 20 of body member 22 and surface 24 of upper roof wall 26. An L-shaped flange member 27 is mounted on body wall surface 20 and includes a flange portion 28 which terminates in spaced relation to a dash wall 30 so as to define an opening 32 therewith.

Upper roof wall 26 is recessed at its forward edge and terminates in a flange 34 extending forwardly from surface 24. Flange 34 coacts with similarly formed flanges on roof walls 36 and 38 to provide a window and seal supporting surface.

A seal member 40 is provided and includes a groove or recess 42 adapted to receive the outer edge of windshield 12. Seal 40 also includes a transversely offset and oppositely opening groove 44 adapted to receive body and roof flanges 28 and 34 in order to retain the seal member against separation from the vehicle body. Seal groove 42 is adapted to be filled with a suitable sealing substance 46 in order to insure against leakage around the windshield.

Seal 40 is made of a natural or synthetic rubber material as has been used in the past, but the seal is modified to stiffen the seal assembly. As already noted, the purpose of making the seal stiffer than before is to insure that the seal is more readily capable of carrying compression loads without being unduly deformed relative to its normal sealing position. In this case the bottom edge 48 of seal 40 is cut off or shortened resulting in a space or cavity being left between the seal bottom and the supporting surfaces 24 and 27. Accordingly, and as part of the concerted effort to stiffen the sealing assembly, the cavity left between bottom edge 48 of seal 40 and its body supporting structure is filled with a cement material 50. Cement 50 may be a plastic or other suitable material which sets up hard and thereby stiffens the seal assembly enabling it to better withstand compressive loading.

The use of cement material 50 also fills in irregularities between the windows and the body. This results in substantially full contact between the windows and body thereby tending to equally distribute loading pressures around the window periphery.

Trim strips 52 are suitably mounted to the vehicle body and roof through appropriate retainer members 54 and are adapted to at least partially enclose the front or exposed face 56 of seal 40. Trim strips 52 are sufficiently wide to cover the cemented joint 50 after the cement has been applied with the window in position on the vehicle body. In the event it becomes necessary to change windshield 12 or rear window 14, the trim strips are removed to provide access to the seal which may thereafter be removed. Strips 52 not only enhance the seal appearance but also protect the cemented seal joint.

While the seals for the front and rear windows may be slightly different in configuration to accommodate varying body requirements, the principle of construction and mounting are the same. The same is true of the trim or molding strips and accordingly with both the strips and the seals the same identifying numerals have been used throughout all figures even though FIGURES 4 through 6 refer to rear window 14.

I claim:
1. A vehicle window seal assembly comprising a seal supporting surface formed around the periphery of a body window opening, a window disposed in said opening, a sealing member secured to said window and adapted to be disposed between the outer periphery of said window and the body seal supporting surface, a body flange extending from the seal supporting surface, transversely spaced and oppositely opening recesses formed in the seal member for respectively receiving the outer edge of said window and said flange, said seal including a bottom surface proximately spaced from the seal supporting surface so as to define a peripheral cavity therewith, a cement material filling said cavity to rigidify the seal assembly, and a trim strip mounted on the exterior of the vehicle body proximate the window opening and adapted to enclose the cemented portion of said seal assembly.

2. A vehicle window seal assembly comprising a seal supporting surface formed around the periphery of a body window opening, a window disposed in said opening, a continuous seal member secured to said window and adapted to be disposed between the outer periphery of said window and the body seal supporting surface, said seal including an outer face disposed exteriorly of the vehicle body, a body flange extending from the seal supporting surface, transversely spaced and oppositely opening recesses formed in the seal member for respectively receiving the outer edge of said window and said flange, said seal including a bottom surface proximately spaced from the seal supporting surface so as to define a peripheral cavity therewith, said cavity being closed at one end by the body flange, the other end of the cavity being open and terminating adjacent the outer seal face, a cement material filling said cavity to rigidify the seal assembly, and a trim strip mounted on the exterior of said vehicle body proximate the window opening and abuttingly engaging the body and the outer seal face to enclose said cavity.

3. A vehicle window seal assembly comprising a seal supporting surface formed around the periphery of a body window opening, a window disposed in said opening, a seal member secured to said window and adapted to be disposed between the outer periphery of said window and the body seal supporting surface, a body flange extending from the seal supporting surface, transversely spaced and oppositely opening recesses formed in the seal member for respectively receiving the outer edge of said window and said flange, said seal including a bottom surface proximately spaced from the seal supporting surface so as to define a peripheral cavity therewith, a cement material filling said cavity to rigidify the seal assembly, said seal including an outer face disposed exteriorly of the vehicle body, said cavity being closed at one end by the body flange, the other end of the cavity being open and terminating adjacent the outer seal face.

References Cited in the file of this patent

UNITED STATES PATENTS

| | | |
|---|---|---|
| 2,569,955 | Schassberger | Oct. 2, 1951 |
| 2,761,536 | Bradley | Sept. 4, 1956 |
| 2,781,561 | Gifford et al. | Feb. 19, 1957 |
| 2,814,525 | Thomas | Nov. 26, 1957 |
| 2,919,478 | Sehn | Jan. 5, 1960 |